US012105490B2

(12) United States Patent
Dingari et al.

(10) Patent No.: US 12,105,490 B2
(45) Date of Patent: *Oct. 1, 2024

(54) ISOLATION OF PROTECTION FUNCTIONS IN ELECTRICAL POWER SYSTEMS

(71) Applicant: Schweitzer Engineering Laboratories, Inc., Pullman, WA (US)

(72) Inventors: Sreenivas Dingari, Chester Springs, PA (US); Angelo D'Aversa, Ambler, PA (US); Veselin Skendzic, Schwenksville, PA (US); Chandrasekaran Swaminathan, Orefield, PA (US); Greg Rzepka, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 424 days.

This patent is subject to a terminal disclaimer.

(21) Appl. No.: 17/492,908

(22) Filed: Oct. 4, 2021

(65) Prior Publication Data

US 2023/0105068 A1 Apr. 6, 2023

(51) Int. Cl.
*G05B 19/042* (2006.01)
*G06F 3/06* (2006.01)
*H02H 1/00* (2006.01)

(52) U.S. Cl.
CPC ........ *G05B 19/042* (2013.01); *G06F 3/0604* (2013.01); *G06F 3/0646* (2013.01); *G06F 3/0673* (2013.01); *G05B 2219/24215* (2013.01); *G05B 2219/2639* (2013.01); *H02H 1/0092* (2013.01)

(58) Field of Classification Search
CPC ........ G05B 19/042; G05B 2219/24215; G05B 2219/2639; G05B 19/0428; G06F 3/0604; G06F 3/0646; G06F 3/0673; G06F 3/0617; G06F 3/0619; G06F 3/0634; G06F 3/0688; H02H 1/0092
See application file for complete search history.

(56) References Cited

U.S. PATENT DOCUMENTS

| | | | |
|---|---|---|---|
| 4,535,306 A | 8/1985 | Yamaguchi | |
| 4,546,486 A | 10/1985 | Evans | |
| 4,768,178 A | 8/1988 | Conklin | |
| 4,808,884 A | 2/1989 | Hull | |
| 5,103,466 A | 4/1992 | Bazes | |
| 5,235,590 A | 8/1993 | Taguchi | |
| 5,363,377 A | 11/1994 | Sharpe | |
| 5,793,869 A | 8/1998 | Claflin | |
| 5,963,734 A * | 10/1999 | Ackerman | G05B 19/0428 702/62 |
| 6,456,831 B1 | 9/2002 | Tada | |
| 6,678,134 B2 | 1/2004 | Sugiura | |
| 6,754,210 B1 | 6/2004 | Ofek | |

(Continued)

*Primary Examiner* — Charles Cai
(74) *Attorney, Agent, or Firm* — Jared L. Cherry (57) ABSTRACT

Systems, devices, and methods include protection functions in an electrical power system. A processing subsystem may include a processor. A memory subsystem may comprise a first memory section and a second memory section. A memory management subsystem may, in a first operational mode, enable memory access between the processor and the first memory section and the second memory section and, in a second operational mode, enable memory access between the processor and only the first memory section.

16 Claims, 4 Drawing Sheets

(56) References Cited

U.S. PATENT DOCUMENTS

| | | | |
|---|---|---|---|
| 6,847,691 B2 | 1/2005 | Torikoshi | |
| 6,859,742 B2 | 2/2005 | Randall | |
| 6,891,441 B2 | 5/2005 | Rochow | |
| 6,937,683 B1 | 8/2005 | Ratzel | |
| 6,947,269 B2 | 9/2005 | Lee | |
| 7,239,581 B2 | 7/2007 | Delgado | |
| 7,272,201 B2 | 9/2007 | Whitehead | |
| 7,283,568 B2 | 10/2007 | Robie | |
| 7,463,467 B2 | 12/2008 | Lee | |
| 7,571,216 B1 | 8/2009 | Mcrae | |
| 7,617,408 B2 | 11/2009 | Frazier | |
| 7,701,683 B2 | 4/2010 | Morris | |
| 8,351,433 B2 | 1/2013 | Morris | |
| 9,530,466 B1 * | 12/2016 | Zhu | G06F 12/0292 |
| 11,137,994 B2 * | 10/2021 | Ladkani | G06F 3/0655 |
| 2001/0023464 A1 | 9/2001 | Deck | |
| 2002/0069299 A1 | 6/2002 | Rosener | |
| 2002/0080808 A1 | 6/2002 | Leung | |
| 2004/0196855 A1 | 10/2004 | Davies | |
| 2007/0002746 A1 | 1/2007 | Shankar | |
| 2007/0127487 A1 | 6/2007 | Kim | |
| 2007/0147415 A1 | 6/2007 | Marusca | |
| 2008/0071482 A1 | 3/2008 | Zweigle | |
| 2008/0235355 A1 | 9/2008 | Spanier | |
| 2009/0141727 A1 | 6/2009 | Brown | |
| 2009/0260083 A1 | 10/2009 | Szeto | |
| 2009/0300165 A1 | 12/2009 | Tuckey | |
| 2010/0195763 A1 | 8/2010 | Lee | |
| 2012/0078555 A1 | 3/2012 | Banhegyesi | |
| 2021/0359508 A1 | 11/2021 | Nelms | |
| 2022/0363277 A1 * | 11/2022 | Deckmyn | G06F 3/061 |

* cited by examiner

ISOLATION OF PROTECTION FUNCTIONS IN ELECTRICAL POWER SYSTEMS

TECHNICAL FIELD

This disclosure relates to systems and methods for isolation of certain functions of an electrical power system from other functions deemed of lesser importance. For example, systems and methods according to the present disclosure may be used to separate functions related to the protection of an electrical power distribution system from other less important or less critical functions.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Electric power delivery systems are widely used to generate, transmit, and distribute electric power to loads, and serve as an important part of critical infrastructure. Power systems and components are often monitored and protected by intelligent electronic devices (IEDs) and systems of IEDs that obtain electric power system information from the equipment and monitor, automate, and provide protective actions for the power system. Several IEDs may be in communication to facilitate sharing of information for station-wide, area-wide, or even system-wide protection.

For example, protection devices or relays may be IEDs that provide protection functions (e.g., detection and/or mitigation of faults or potential faults, such as overcurrent, differential, directional, distance, undervoltage, voltage regulation, bus protection, overfrequency, underfrequency, traveling wave, and/or other protection operations) to one or more portions of the electric power system. Stated in another way, a protection device or relay may be an IED that executes one or more operations to monitor and/or protect one or more portions of the electric power system and to decrease the likelihood of failure in the electric power system that may cause interruption of electric power and/or damage to the system or external objects proximate the electric power system.

Due to the critical nature of electric power systems, protection and monitoring by the IEDs may assist in avoiding disruption of power systems. However, protection related functions in the IEDs may take up as little as 5 to 10% of computing resources (e.g., firmware), while non-protection functions take up relatively more, a majority of, or even all the remaining resources. Such non-protection functions may include, for example, supervisory control and data acquisition (SCADA) communications, other communications, event reporting, metering, diagnostics, and time management protocols.

The firmware running on these IEDs has become complicated with the addition of non-protection related features, such as, for example, communication protocols and automation features. These features can potentially affect the mission critical protection applications and can reduce the overall reliability of the device.

It is generally accepted that the number of vulnerabilities, flaws, or bugs in computer code grows with the number of lines of code being implemented in a system. Estimates range from about 15 to 50 bugs per 1000 lines of code. With a monolithic (e.g., non-partitioned) firmware architecture, a bug in any part of the system may cause the entire system to fail. Thus, running code associated with functions unrelated to protection functions (e.g., event reporting, time management protocols, etc.) within an IED that is also running code for protection functions may render the protection functions provided by the IED less reliable due to the greater complexity and higher number of errors, which could result in misoperation of the device. Such errors may be vulnerabilities that could be exploited to gain unauthorized access to the IED, and such unauthorized access may be used to shut down portions of the electric power system through intentional or unintentional misoperation.

Embodiments of the disclosure may provide solutions to this problem by providing IEDs with a full-featured operating system (e.g., Linux, Unix, QNX, VXWorks, etc.) that are capable of managing operation of software (e.g., firmware) executed in the IED by a processor. For example, on a system with a processor, the operating system may determine (e.g., prioritize) which function runs on the processor using one or more management features, such as, for example, a processor interrupt system, memory management unit, and partitioning of code into protection-enabling code and other code that handles other functions or control of the IED.

Embodiments of the disclosure may provide distinct and separate firmware images/applications where management of the firmware in the memory (e.g., via partitioning and/or one or more memory barriers) may at least partially prevent protection firmware from being corrupted. Such barriers and/or partitioning may enable protection to continue processing if the memory from the system firmware becomes corrupted. Subsequently, the system firmware can be reset, restarted, and/or updated, while protection is still being run by the processor. Such a resetting, restarting, and/or updating of the non-protection functions may be accomplished without interrupting the protection functions.

With certain functions (e.g., firmware related to protection functions) isolated from other functions (e.g., firmware related to non-protection functions) in such a system, the system may continue to operate even where there is an issue with the non-protection firmware. Such a system may continue to rely on the hundreds of thousands of lines of code that are necessary to run the complex operating system, even where the complexity associated with such large operating systems without otherwise compromising the protection functions.

According to embodiments of the disclosure, IEDs (e.g., relays) may include architecture in which protection functions (i.e., those functions associated with operation of the electric power delivery system) are isolated from non-protection functions (i.e., those functions not associated with operation of the electric power delivery system). Such architecture may include a processing device along with memory management or protection. The memory may be partitioned into several applications (e.g., subsystems, executables, etc.) where the processing of each application (e.g., each firmware image) may be managed and where protection firmware may be isolated from non-protection functions. In some embodiments, the system memory may be partitioned at boot time and use a memory management unit (MMU), a memory protection unit, and/or memory barriers to prevent applications from accessing memory containing other applications' code and data.

In accordance with some embodiments of the disclosure, protection functions may run in their own application, either with or without an operating system. For example, the protection function may operate in isolation from a majority or entirety of other functions or applications including the operating system. Such an application may primarily only perform protection functions. The code for the protection function applications may be made as relatively simple and small as possible (e.g., as compared with code for relatively more complex systems, such as an operating system, or an aggregate of code for multiple other functions and applications). Thus, in such a system with the ability to isolate the protection functions, the reliability of the protection functions may not be dependent on the quality of the code associated with features in the relays that are tasked with performing monitoring and protection functions. For example, in such a configuration, a fault occurring while running non-protection functions may cause that the firmware associated with those functions to be reset, restarted, updated, or otherwise remedied. However, the protection functions may remain substantially unaffected and continue to operate in a reliable manner. Accordingly, the power system supported by the protection functions may remain unaffected. In some embodiments, functions related to protection (e.g., diagnostic functions, alarm functions, etc.) may also be executed along with protection functions. In such embodiments, the code related to such functions may be limited to certain functions.

Various embodiments consistent with the present disclosure may operate in connection with embedded systems. Embedded systems are designed to do a specific task (e.g., monitoring a portion of an electric power system). Embedded systems consistent with the present disclosure may be designed to provide high reliability and high security.

In some embodiments, the protection elements may collectively or separately be partitioned in selected portions of the memory or on different, isolated portions of the memory where the protection functions are at least partially isolated from other functions performed by the processor.

With such isolation of the protection functions, a particular protection element of the system may continue to provide uninterrupted protection to the electric power system, while one or more other elements of the device experience an error and/or are reset. For example, a first protection function (e.g., a distance or impedance element) may be running on the processor, an overcurrent element may be running on the processor, and an underfrequency element (e.g., abnormal frequency) may be running on the processor. During unavailability of the second or third non-protection functions for any reason (e.g., firmware upgrade, computer failure, code error, firmware reset, etc.), the processor may continue to provide at least some of the protection for the electrical system (e.g., one or more transmission lines being monitored for impedance changes by the distance element).

In some embodiments, the IED may include a monitoring subsystem (e.g., a health monitoring and/or self-diagnostic subsystem). The monitoring subsystem may monitor one or more protection functions and/or one or more non-protective functions. The monitoring system may determine if a detected error on one or more respective functions is to be rectified either with a reset of the respective function(s) or if a restart of the IED is required (e.g., a restart of the processing subsystem of the IED).

Modern electric power protection systems are integrated with automation, monitoring, and supervisory systems, all of which interact through digital communication. Embodiments of the present disclosure may provide relatively more reliable electric power protection system functions including automation, monitoring, and supervisory systems that effectively operate under normal operating conditions, where some of the functions (e.g., selected protection functions) to the power system may continue to operate when there is a fault, error, or other unavailability in the other systems (e.g., the automation, non-protection monitoring, communication, general control systems, and other supervisory systems). Such protection devices and systems may be segregated such that protection functions or operations take place in at least partial isolation (e.g., on common or segregated equipment) and do not rely on, or operate in unison with, other non-protection functions and/or general operating systems.

In some embodiments, and as discussed above, the separation of such functions may be implemented within the same device at a processor level and/or a memory level. Such an approach may be also useful for scenarios where installing two or more separate devices may not be possible (e.g., due to physical space constraints, other constraints on overall system size, etc.).

While protection functions are primarily discussed herein as being separated from other functions, in additional embodiments, any desired first set of functions may be isolated from other functions in accordance with embodiments of the disclosure.

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor do the steps need to be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations. For example, throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Several aspects of the embodiments disclosed herein may be implemented as software modules or components. As used herein, a software module or component may include any type of computer instruction or computer executable code located within a memory device that is operable in conjunction with appropriate hardware to implement the programmed instructions. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory machine-readable medium having stored thereon instructions that may be used to program a computer or other electronic device to perform processes described herein. The non-transitory machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable media suitable for storing electronic instructions. In some embodiments, the computer or another electronic device may include a processing device such as a microprocessor, microcontroller, logic circuitry, or the like. The processing device may further include one or more special-purpose processing devices such as an application specific interface circuit (ASIC), PAL, PLA, PLD, field programmable gate array (FPGA), or any other customizable or programmable device.

Electrical power systems are designed to generate, transmit, and distribute electrical energy to loads. Electrical power systems may include equipment, such as electrical generators, electrical motors, power transformers, power transmission, and distribution lines, circuit breakers, switches, buses, transmission lines, voltage regulators, capacitor banks, and the like. Such equipment may be monitored, controlled, automated, and/or protected using intelligent electronic devices (IEDs) that receive electrical power system information from the equipment, make decisions based on the information, and provide monitoring, control, protection, and/or automation outputs to the equipment.

In some embodiments, an IED may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communication processors, computing platforms, programmable logic controllers (PLCs), programmable automation controllers, input and output modules, governors, exciters, statcom controllers, static VAR compensator (SVC) controllers, on-load tap changer (OLTC) controllers, and the like. Further, in some embodiments, IEDs may be communicatively connected via a network that includes, for example, multiplexers, routers, hubs, gateways, firewalls, and/or switches to facilitate communications on the networks, each of which may also function as an IED. Networking and communication devices may also be integrated into an IED and/or be in communication with an IED. As used herein, an IED may include a single discrete IED or a system of multiple IEDs operating together.

The electrical power system may be monitored, controlled, automated, and/or protected using intelligent electronic devices (IEDs). In general, IEDs in an electrical power system may be used for protection, control, automation, and/or monitoring of equipment in the system. For example, IEDs may be used to monitor equipment of many types, including electrical transmission lines, electrical distribution lines, current transformers, buses, switches, circuit breakers, reclosers, transformers, autotransformers, tap changers, voltage regulators, capacitor banks, generators, motors, pumps, compressors, valves, and a variety of other types of monitored equipment.

In various embodiments, IEDs may be configured to monitor the frequency of alternating current waveforms, voltage levels, current levels (e.g., overcurrent and/or undercurrent), or other electrical conditions in the electrical power system. A network may be used to transmit information among various components in the electrical power system, including IEDs. In various embodiments, the network may be configured to provide streaming measurements that may be analyzed consistent with the present disclosure to detect anomalies.

A common time signal may be used to time-align measurements for comparison and/or to synchronize action across the electrical power system. Utilizing a common or universal time source may ensure that IEDs have a synchronized time signal that can be used to generate time-synchronized data, such as synchrophasors. In various embodiments, the common time source may comprise a time signal from a global navigation satellite system (GNSS) system. An IED may include a receiver configured to receive the time signal from the GNSS system. In various embodiments, the IED may be configured to distribute the time signal to other components in the electrical power system, such as other IEDs.

Figure 1:
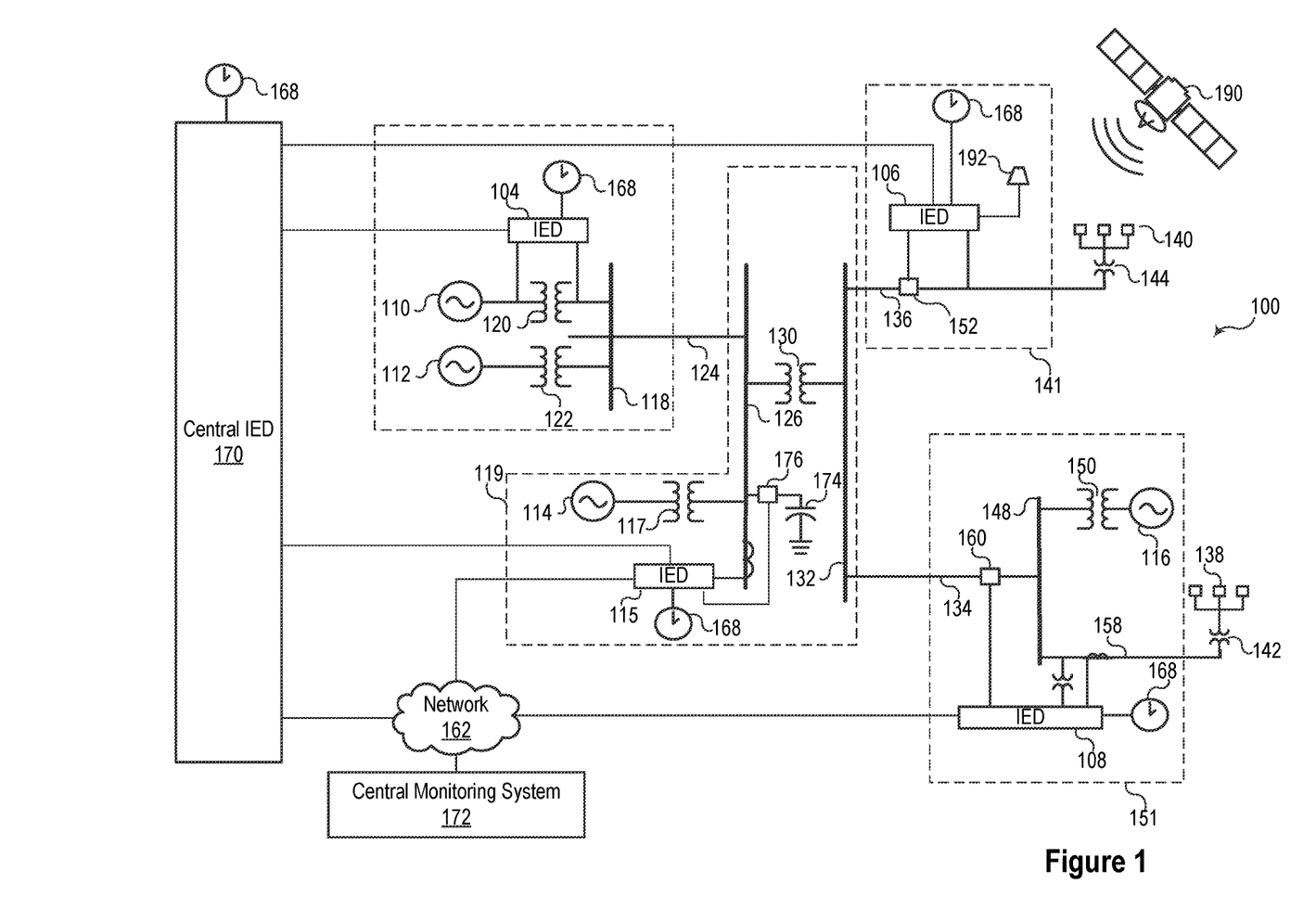
FIG. 1 illustrates a simplified one-line diagram of an electrical power delivery system consistent with embodiments of the present disclosure.

FIG. 1 illustrates a simplified one-line diagram of an electrical power delivery system 100 consistent with embodiments of the present disclosure. Electrical power delivery system 100 may be configured to generate, transmit, and distribute electrical energy to loads. Electrical power delivery systems may include equipment such as electrical generators (e.g., generators 110, 112, 114, and 116), power transformers (e.g., transformers 117, 120, 122, 130, 142, 144, and 150), power transmission and delivery lines (e.g., lines 124, 134, 136, and 158), circuit breakers (e.g., breakers 152, 160, 176), buses (e.g., buses 118, 126, 132, and 148), loads (e.g., loads 140 and 138) and the like. In various embodiments, the electrical generators 110, 112, 114, and 116 may comprise distributed generation sources (e.g., solar or wind generation). A variety of other types of equipment may also be included in electrical power delivery system 100, such as voltage regulators, capacitor banks, and the like.

Substation 119 may include a generator 114, which may be a distributed generator, and which may be connected to bus 126 through step-up transformer 117. Bus 126 may be connected to a distribution bus 132 via a step-down transformer 130. Various distribution lines 136 and 134 may be connected to distribution bus 132. Distribution line 136 may lead to substation 141 where the line 136 is monitored and/or controlled using IED 106, which may selectively open and close breaker 152. Load 140 may be fed from distribution line 136. Further, step-down transformer 144 in communication with distribution bus 132 via distribution line 136 may be used to step down a voltage for consumption by load 140.

Distribution line 134 may lead to substation 151, and deliver electrical power to bus 148. Bus 148 may also receive electrical power from distributed generator 116 via transformer 150. Distribution line 158 may deliver electrical power from bus 148 to load 138, and may include further step-down transformer 142. Circuit breaker 160 may be used to selectively connect bus 148 to distribution line 134. IED 108 may be used to monitor and/or control circuit breaker 160 as well as distribution line 158.

Electrical power delivery system 100 may be monitored, controlled, automated, and/or protected using IEDs, such as IEDs 104, 106, 108, 115, and 170, and a central monitoring system 172. In general, IEDs in an electrical power generation and transmission system may be used for protection, control, automation, and/or monitoring of equipment in the system. For example, IEDs may be used to monitor equipment of many types, including electrical transmission lines, electrical distribution lines, current transformers, buses, switches, circuit breakers, reclosers, transformers, autotransformers, tap changers, voltage regulators, capacitor banks, generators, motors, pumps, compressors, valves, and a variety of other types of monitored equipment.

An IED (such as IEDs 104, 106, 108, 115, and 170) may refer to any microprocessor-based device that monitors, controls, automates, and/or protects monitored equipment within system 100. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

Central monitoring system 172 may comprise one or more of a variety of types of systems. For example, central monitoring system 172 may include a supervisory control and data acquisition (SCADA) system and/or a wide area control and situational awareness (WACSA) system. A central IED 170 may be in communication with IEDs 104, 106, 108, and 115. IEDs 104, 106, 108, and 115 may be remote from the central IED 170, and may communicate over various media such as a direct communication from IED 106 or over a wide-area communications network 162. According to various embodiments, certain IEDs may be in direct communication with other IEDs (e.g., IED 104 is in direct communication with central IED 170) or may be in communication via communication network 162 (e.g., IED 108 is in communication with central IED 170 via communication network 162).

As discussed above and in further detail below, one or more of the IEDs 104, 106, 108, 115, and 170 may be configured to separate and prioritize selected functions separately (e.g., via memory and/or processor management). For example, one or more functions (e.g., functions of relative higher priority, such as protection functions) may be segregated from one or more other functions (e.g., operating systems, communications, SCADA, etc.) in the memory of the IEDs 104, 106, 108, 115, and 170. One or more of the protection functions (e.g., overcurrent, differential, directional, distance, undervoltage, voltage regulation, bus protection, overfrequency, underfrequency, traveling wave, and other protection operations) for one or more portions of the electric power system (e.g., the feeders, the buses, the transformers, etc.) may be stored and managed separately (e.g., stored separately in the memory of the respective IED and/or provided to the processor) from one or more other functions. Where more than one protection function is implemented, the protection functions may be stored and executed separately or as a group.

A common time signal 168 may be used to time-align measurements for comparison and/or to synchronize actions across system 100. Utilizing a common or universal time source may ensure that IEDs have a synchronized time signal that can be used to generate time-synchronized data, such as synchrophasors. In various embodiments, the common time source 168 may comprise a time signal from a GNSS system 190. IED 106 may include a receiver 192 configured to receive the time signal from the GNSS system 190. In various embodiments, IED 106 may be configured to distribute the time signal to other components in system 100, such as IEDs 104, 108, 115, and 170.

In various embodiments, wireless current sensors may be utilized in system 100 to measure electrical parameters in system 100. Such measurements may be utilized by various control systems to implement control actions in system 100. In one specific embodiment, wireless current sensors may be utilized in connection with distribution equipment, such as capacitor bank controls and other equipment that rely on phasor data for operation. Such systems may measure the degree to which the voltage of the power system is out of phase with the current of the system. Reactive power support may be provided by selectively connecting a capacitor bank 174 to system 100 using a breaker 176.

Figure 2:
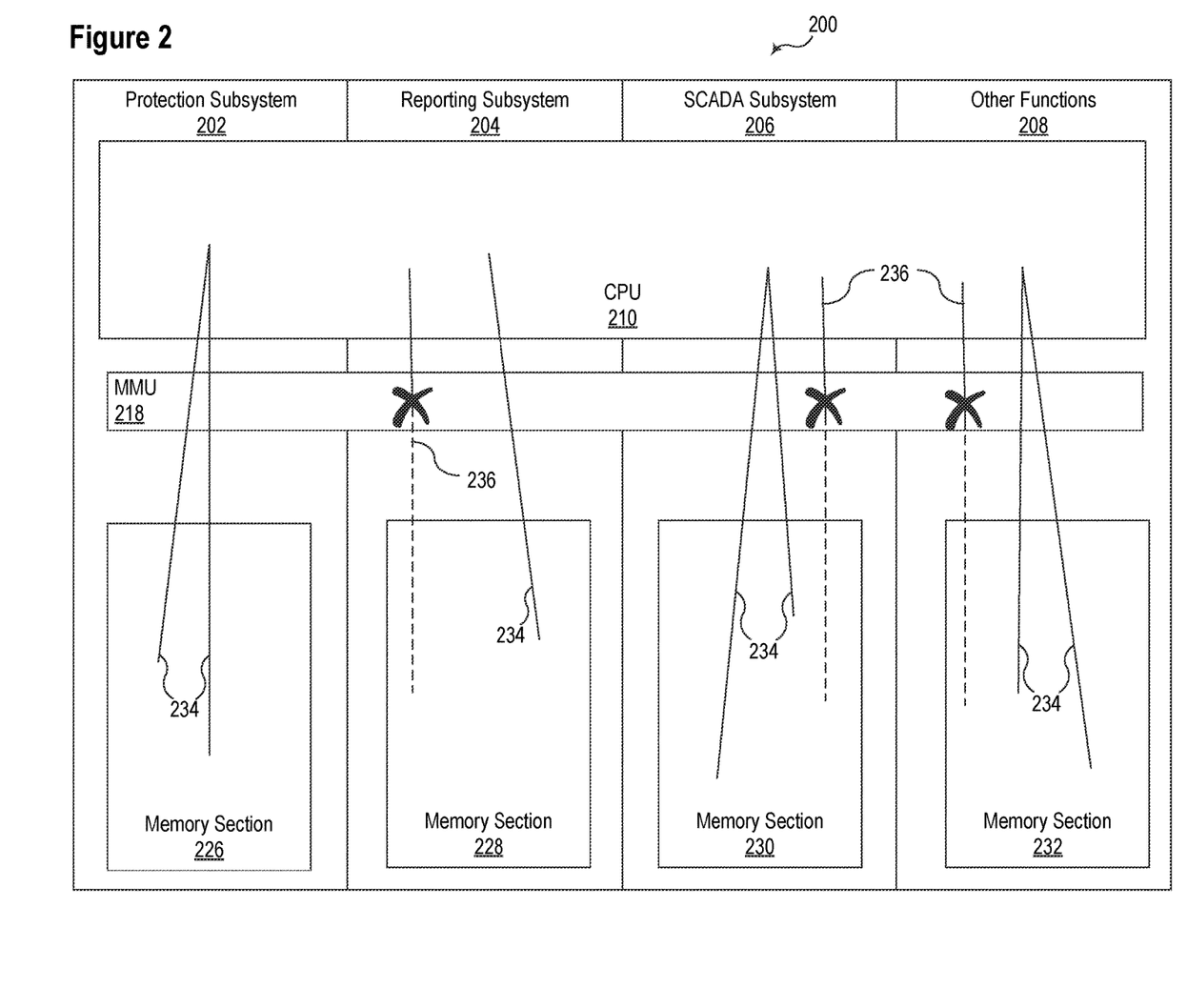
FIG. 2 illustrates a simplified representation of a system for use in an electric power system to perform a plurality of functions consistent with embodiments of the present disclosure.

FIG. 2 illustrates a simplified representation of a system 200 for use in an electric power system to perform a plurality of functions consistent with embodiments of the present disclosure. System 200 includes a protection subsystem 202, a reporting subsystem 204, a SCADA subsystem 206, and other functions 208. As illustrated, each subsystem may include memory having one or more selected memory sections (e.g., partitioned memory sections 226, 228, 230, and 232) that may be in communication with a common CPU (e.g., processor 210) and memory management features 218. As depicted the system 200 may include common memory management features 218. In additional embodiments, the system 200 may include memory management features individually associated with each memory section 226, 228, 230, and 232.

In some embodiments, the memory management features 218 may include one or more of a memory management unit (MMU), a processor interrupt system, and a partitioning of code.

Selected code (e.g., firmware images) may be executed based on the current operational mode. For example, during unrestricted operation, the memory management features 218 (e.g., one or more MMUs) may enable or permit requests 234 to access any of the memory sections 226, 228, 230, and 232 and enable the code from any of the memory sections 226, 228, 230, and 232 to be executed by the processor 210. However, during operations with at least some restriction (e.g., during startup, during a detected malfunction of in the code or in the overall system 200), the memory management features 218 may restrict requests 236 to access one or more of the memory sections 228, 230, and 232 and/or restrict the code from one or more of the memory sections 228, 230, and 232 from being executed by the processor 210. For example, in a restricted mode, only code from the protection subsystem 202 may be provided from the memory section 226 and that code may be accessed and executed by the processor 210 while code from the other subsystems 204, 206, and 208 are prevented from being accessed and/or executed. By way of further example, in restricted mode, code from the protection subsystem 202 may be prioritized over code from the other subsystems 204, 206, and 208.

The protection subsystem 202 may execute code stored on memory 226 using processor 210. The operation of protection subsystem 202 may be independent of the other subsystems in system 200 and may be prioritized over other subsystems. For example, the isolated memory sections 226, 228, 230, and 232 may allow each subsystem 202, 204, 206, and 208, to executed independently, where the code (e.g., firmware images) associated with each memory sections 226, 228, 230, and 232 may be selectively executed and/or may be selectively terminated and/or prohibited from execution. Where implemented, a processor interrupt system of the memory management features 218 may cease the execution of at least some of the code (e.g., from the subsystems 204, 206, and 208) and may direct the processor 210 to execute only the code from the protection subsystem 202 (e.g., for a selected period of time, while selected operational state is maintained, etc.).

The subsystems illustrated in FIG. 2 may be embodied in a variety of ways in different embodiments. In one embodiment, system 200 may include physically distinct memory sections. In other embodiments, resources of a single system may be physically shared and logically separated (e.g., partitioned). For example, each memory section may be a portion of a larger memory array.

Figure 3:
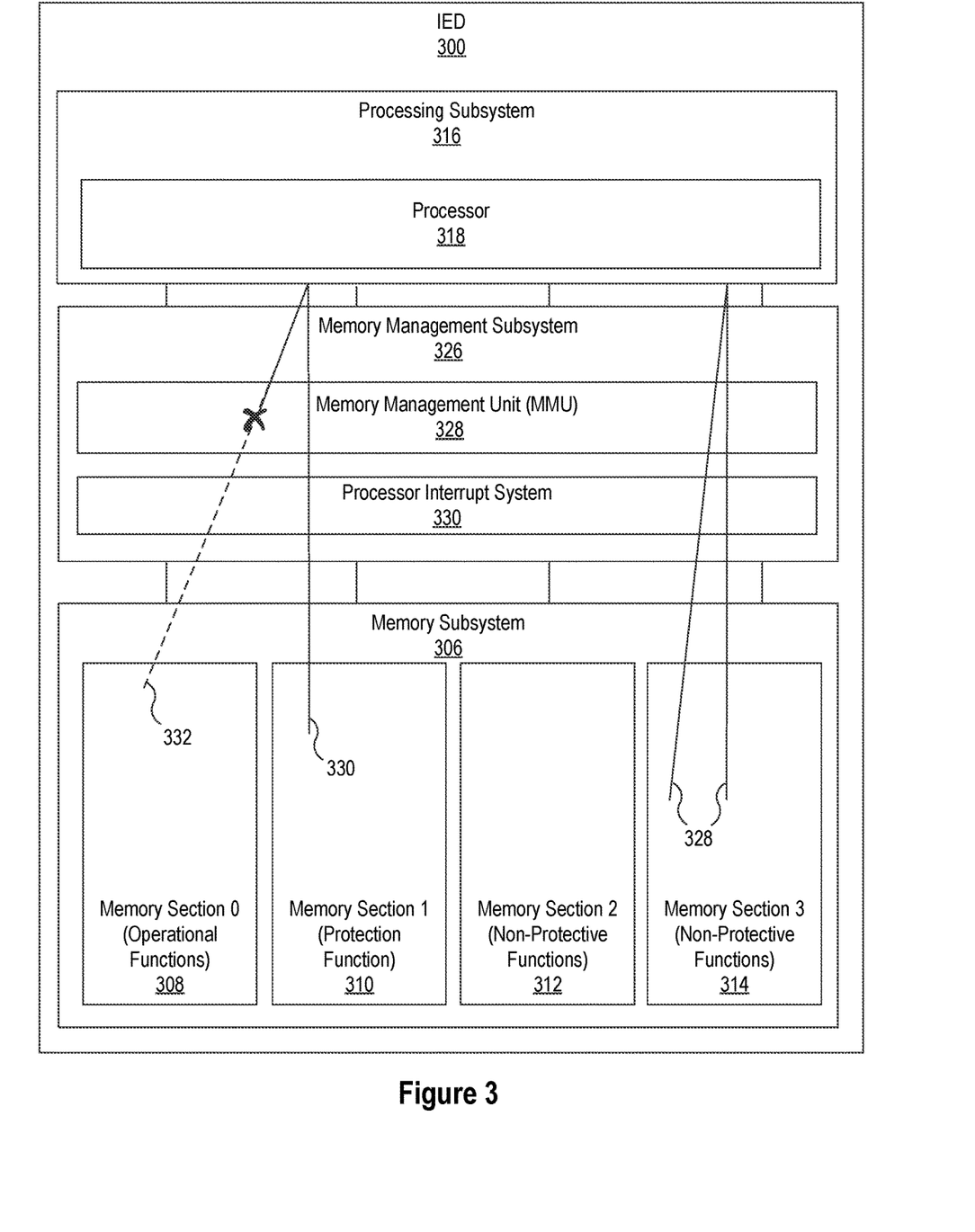
FIG. 3 illustrates a simplified representation of a protection intelligent electronic device (IED) for use in an electric power system and in which system resources are allocated to a plurality of functions consistent with embodiments of the present disclosure.

FIG. 3 illustrates a simplified representation of an IED 300 for use in an electric power system and in which system resources are allocated to a plurality of functions consistent with embodiments of the present disclosure. IED 300 may perform one or more protection functions (e.g., a transformer protection relay, a bus protection relay, and/or a feeder protection relay). The IED 300 may be in communication with other IEDs (e.g., as depicted above in FIG. 1) to receive power system information, for example, such as currents and/or voltages from the power system (e.g., from potential transformers (PT), current transformers (CT), etc.), along with communications, alerts, etc.

As depicted, the IED 300 may include a processing subsystem 316, a memory subsystem 306, and a memory management subsystem 326. In the processing subsystem 316, processor 318 may execute tasks relating to the management and allocation of hardware, software resources, and provision of common services for other functions of the IED 300 (e.g., operational functions). Processor 318 may also provide protection functions relating to monitoring and/or controlling one or more aspects of the electrical power system, such as those discussed above. Processor 318 may further execute code that is not directly related to the protection functions, such as SCADA communications, communications between multiple IEDs, event reporting, and time management protocols (e.g., non-protection functions). Processor 318 may execute code related to event reporting.

As discussed above, in one or more operational modes, the protection functions may be prioritized over the other functions (e.g., the non-protection and/or operational/control functions). For example, in some operational modes, only the protection functions may be provided (e.g., as firmware images) to the processor 318. In some operational modes, non-protective functions may be provided to processor 318 only when the protection functions are determined to be operating within a selected range (e.g., determined to be adequately protecting the system) and/or when the non-protective functions are operating within a selected range (e.g., operating without substantial errors). Execution of the non-protective functions by to processor 318 may be once again ceased if operation of the protection functions and/or the non-protection functions deviate from the selected respective ranges.

The IED 300 may include system memory 306 that may be partitioned (e.g., at startup of the IED 300) into sections allocated to a particular function or subsystem. In the illustrated embodiment, memory section 0 308 is associated with operational functions, memory section 1 310 is associated with protection functions, memory section 2 312 is associated with non-protection functions, and memory section 3 314 is associated with non-protection functions.

The resources of the memory subsystem 306 may be permanently allocated to a particular function or may be allocated for a period of time and then reassigned or unassigned as necessary. The processing subsystem 316 may be a single processing device.

A memory management subsystem 326 may manage access to the code (e.g., firmware images) stored in the memory subsystem 306. For example, the memory management subsystem 326 may selectively grant or deny access to information stored in memory subsystem 306 to code executing on processing subsystem 316. As above, the memory management subsystem 326 may include one or more of a memory management unit (MMU) 328, a processor interrupt system 330, memory partition and/or memory barrier features (e.g., the partitions or sections 308, 310, 312, and 314 of memory subsystem 326).

Memory management subsystem 326 (e.g., the memory management unit (MMU) 328) may allow requests 332 for information stored in memory section 3 314. Similarly, memory management subsystem 334 may allow a request 332 to access information stored in memory section 1 310. However, memory management subsystem 326 may block request 336 to access information stored in memory section 0 308 under certain operational conditions (e.g., during startup, during a maloperation or failure).

In some embodiments, the memory management subsystem 326 (e.g., the processor interrupt system 330) may modify which code is executed by the processor 316. For example, under certain operational conditions, code being executed from memory section 0 308 and memory section 3 314 may be interrupted while code from memory section 1 310 may be prioritized to start execution or to continue execution by the processor 318.

As above, the memory management device 326 may comprise a single device, a plurality of devices for each subsystem, or combinations thereof.

Figure 4:
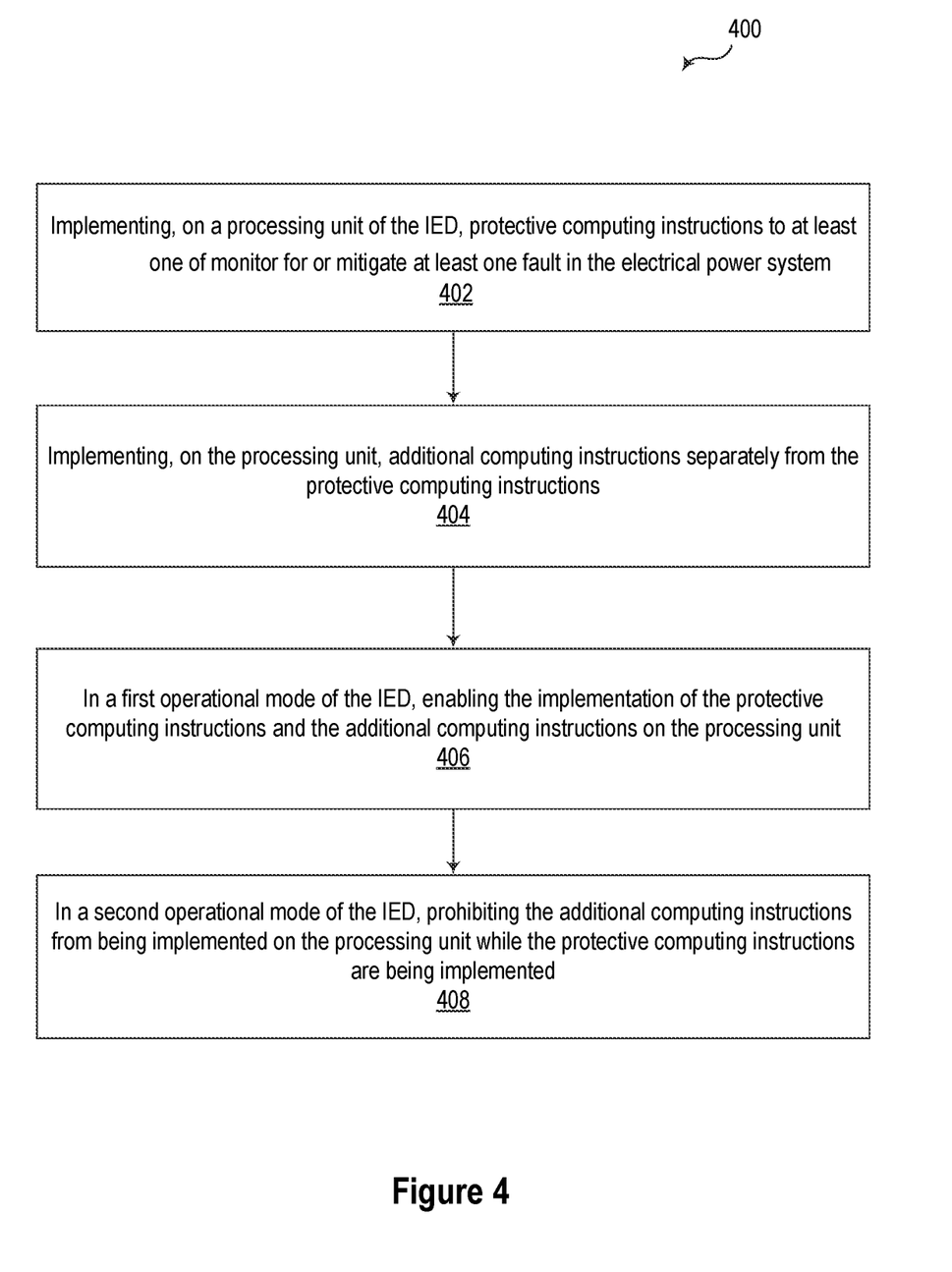
FIG. 4 illustrates a flow chart of a method of operating a protection IED in an electric power system consistent with embodiments of the present disclosure.

FIG. 4 illustrates a flow chart of a method 400 of operating a protection IED in an electric power system. At 402, on a processing unit of the IED, protection computing instructions to at least one of monitor for or mitigate at least one fault in the electrical power system may be implemented. In some embodiments, the processor may be embodied as processor 210 in FIG. 2 or processing subsystem 316 in FIG. 3. Such systems may be used in an electric power system, such as the electric power system 100 illustrated in FIG. 1.

In various embodiments, the protection computing instructions may comprise an overcurrent protection function, a differential protection function, a directional protection function, a distance protection function, an undervoltage protection function, a voltage regulation protection function, a bus protection function, an overfrequency protection function, an underfrequency protection function, or a traveling wave protection function.

At 404, on the processing unit, additional computing instructions may be implemented separately from the protection computing instructions. In various embodiments, the additional computing instructions may comprise supervisory control and data acquisition (SCADA) communications, communications between multiple IEDs, event reporting, metering, or time management protocols. The additional computing instructions may operate independently of the protection computing instructions, such that the additional computing instructions may be updated, reset, or suffer a fault or corruption without interrupting the protection computing instructions.

As noted above, in some embodiments, a monitoring subsystem may determine if a detected error on the additional or the protective computing instructions is to be rectified either with a reset of the respective function(s) or if a restart of the IED is required.

The computer instructions (e.g., code, firmware, etc.) may be stored on a memory subsystem comprising a plurality of physically discrete memory elements. In other embodiments, a single computer-readable medium may comprise logical divisions corresponding to the first memory section and the second memory section. In various embodiments, the memory sections may be embodied as memory sections 226-232 in FIG. 2 or as memory sections 0-3 308-314 in FIG. 3.

At 406, in a first operational mode of the IED, the protection computing instructions and the additional computing instructions on the processing unit may be implemented. Memory access for implementation of the computer instructions may be enabled by a memory management unit or subsystem, such as memory management units 218-224 in FIG. 2 or memory management subsystem 326 in FIG. 3.

At 410, in a second operational mode of the IED, prohibiting the additional computing instructions be prohibited from being implemented on the processing unit while the protection computing instructions are being implemented.

While specific embodiments and applications of the disclosure have been illustrated and described, it is to be understood that the disclosure is not limited to the specific configurations and components disclosed herein. Accordingly, many changes may be made to the details of the above-described embodiments without departing from the underlying principles of this disclosure. The scope of the present invention should, therefore, be determined only by the following claims.

What is claimed is:

1. An intelligent electronic device (IED) for use in an electrical power system, the IED comprising:
   a processing subsystem comprising a processor;
   a memory subsystem comprising a first memory section and a second memory section, the first memory section including a first set of code to provide at least one protection function relating to the electrical power system, the second memory section including a second set of code to provide at least one additional function relating to the electrical power system that is distinct from the at least one protection function provided by the first set of code;
   a memory management subsystem in communication with the processing subsystem to:
      in a first operational mode, enable memory access between the processor and the first memory section and the second memory section; and
      in a second operational mode, prioritize memory access between the processor and the first memory section;
   a protection subsystem comprising the processor and the first memory section to enable use of the at least one protection function with at least a portion of the electrical power system;
   wherein the memory management subsystem comprises a processor interrupt feature, the processor interrupt feature to cease the at least one additional function from execution on the processor while the at least one protection function is permitted to execute on the processor.

2. The IED of claim 1, wherein the second set of code provides at least one non-protection function relating to the electrical power system.

3. The IED of claim 1, wherein the memory management subsystem is to prevent memory access between the processor and the second memory section in the second operational mode.

4. The IED of claim 1, wherein the memory management subsystem is to prioritize execution of the first set of code to provide the at least one protection function over any other code stored in the memory subsystem.

5. The IED of claim 1, wherein the at least one protection function comprises at least one of an overcurrent protection function, a differential protection function, a directional protection function, a distance protection function, an undervoltage protection function, a voltage regulation protection function, a bus protection function, an overfrequency protection function, an underfrequency protection function, or a traveling wave protection function.

6. The IED of claim 1, wherein the IED is operable to update or reset the at least one additional function without interruption of the at least one protection function.

7. An intelligent electronic device (IED) for use in an electrical power system, the IED comprising:
   a processing subsystem comprising a processor;
   a memory subsystem comprising a first memory section and a second memory section, the first memory section including a first set of code to provide at least one protection function relating to the electrical power system, the second memory section including a second set of code to provide at least one additional function relating to the electrical power system that is distinct from the at least one protection function provided by the first set of code;
   a memory management subsystem in communication with the processing subsystem to:
      in a first operational mode, enable memory access between the processor and the first memory section and the second memory section; and
      in a second operational mode, prioritize memory access between the processor and the first memory section;
   a protection subsystem comprising the processor and the first memory section to enable use of the at least one protection function with at least a portion of the electrical power system; and
   a monitoring subsystem, the monitoring subsystem to monitor one or more of the at least one additional function or the at least one protection function to determine if a detected error is to be rectified with a reset of the one or more of the at least one additional function or the at least one protection function or is to be rectified with a restart of the processing subsystem of the IED.

8. The IED of claim 1, wherein the at least one additional function comprises one of supervisory control and data acquisition (SCADA) communications, communications between multiple IEDs, event reporting, metering, or time management protocols.

9. The IED of claim 1, wherein the first memory section and the second memory section each comprise a logical subsection of a computer readable medium.

10. The IED of claim 1, wherein the first memory section and the second memory section each comprise a separate computer readable medium.

11. A method of operating an intelligent electronic device (IED) in an electrical power system, the method comprising:
    implementing, on a processing unit of the IED, protection computing instructions to at least one of monitor for or mitigate at least one fault in the electrical power system;
    implementing, on the processing unit, additional computing instructions separately from the protection computing instructions;
    in a first operational mode of the IED, enabling the implementation of the protection computing instructions and the additional computing instructions on the processing unit;
    in a second operational mode of the IED, prohibiting the additional computing instructions from being implemented on the processing unit while the protection computing instructions are being implemented; and
    ceasing execution of the additional computing instructions on the processing unit of the IED with a processor interrupt feature of the IED.

12. The method of claim 11, further comprising providing a non-protection function to at least a portion of the electrical power system with the additional computing instructions.

13. The method of claim 11, further comprising selecting the protection computing instructions to comprise at least one of an overcurrent protection function, a differential protection function, a directional protection function, a distance protection function, an undervoltage protection function, a voltage regulation protection function, a bus protection function, an overfrequency protection function, an underfrequency protection function, or a traveling wave protection function.

14. The method of claim 11, further comprising performing one of an update or a reset of the additional computing instructions without interrupting the protection computing instructions.

15. The method of claim 11, wherein the additional computing instructions comprises one of supervisory control and data acquisition (SCADA) communications, communications between multiple IEDs, event reporting, metering, or time management protocols.

16. The method of claim 11, further comprising partitioning the protection computing instructions to a first memory section and the additional computing instructions to a second memory section.

* * * * *